(12) United States Patent
Nagayama et al.

(10) Patent No.: US 6,362,030 B1
(45) Date of Patent: Mar. 26, 2002

(54) METHOD OF MANUFACTURING AN ACTIVE MATRIX SUBSTRATE

(75) Inventors: Kohei Nagayama; Yasuyuki Hanazawa, both of Fukaya (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/553,031

(22) Filed: Apr. 20, 2000

(30) Foreign Application Priority Data

Apr. 20, 1999 (JP) .......................................... 11-111962

(51) Int. Cl.[7] .............................................. H01L 21/00
(52) U.S. Cl. ........................ 438/151; 438/149; 438/157; 438/283; 438/30; 438/38; 257/72; 257/59; 349/38; 349/160
(58) Field of Search .................................. 438/151, 149, 438/157, 283, 30; 257/72, 59; 349/38, 160

(56) References Cited

U.S. PATENT DOCUMENTS

| | | | | |
|---|---|---|---|---|
| 5,032,536 A | * | 7/1991 | Oritsuki | 438/30 |
| 5,757,444 A | * | 5/1998 | Takemura | 349/38 |
| 6,108,056 A | * | 8/2000 | Nakajima et al. | 349/38 |
| 6,235,561 B1 | * | 5/2001 | Seiki et al. | 438/151 |
| 6,262,438 B1 | * | 7/2001 | Yamazaki | 257/72 |

* cited by examiner

Primary Examiner—Matthew Smith
Assistant Examiner—B. V. Keshavan
(74) Attorney, Agent, or Firm—Pillsbury Winthrop

(57) ABSTRACT

To manufacture an active-matrix substrate, a metal film is formed on a glass substrate. The metal film has a first region and a second region, which lie between other regions of the metal film that will be gate lines and auxiliary capacitance lines. The first and second regions are removed in a process of making, in the metal film, through holes achieving ion doping. Thereafter, the metal film including the first and second regions is patterned, thereby forming gate lines and auxiliary capacitance lines. Hence, the first and second regions of the metal film are etched twice, without increasing the number of steps of manufacturing the active-matrix substrate. The probability of short-circuiting between any gate line and the adjacent auxiliary capacitance line is therefore low.

8 Claims, 8 Drawing Sheets

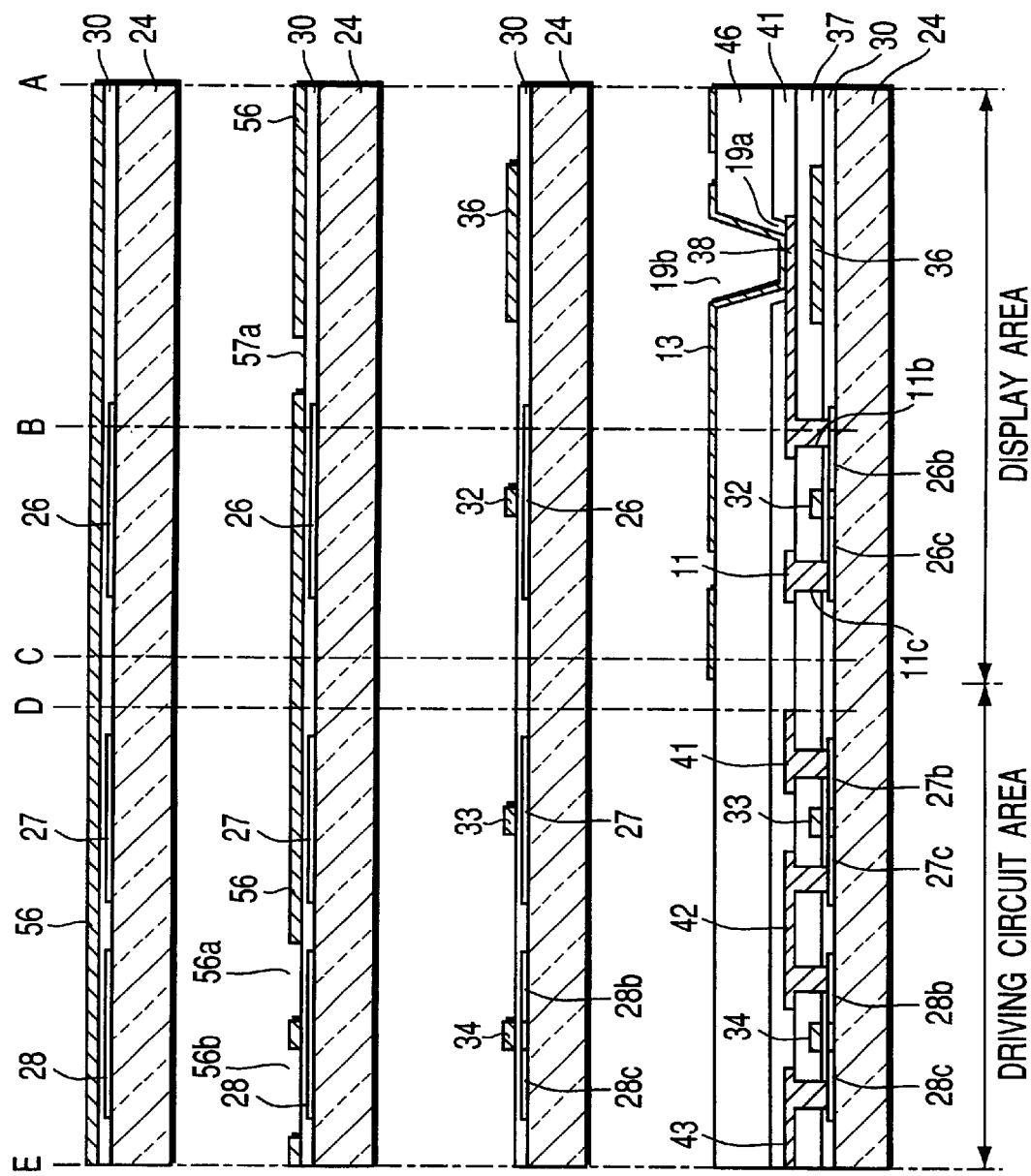

DISPLAY AREA

DISPLAY AREA

METHOD OF MANUFACTURING AN ACTIVE MATRIX SUBSTRATE

CROSS-REFERENCE TO RELATED APPLICATIONS

This application is based upon and claims the benefit of priority from the prior Japanese Patent Application No. 11-111962, filed Apr. 20, 1999, the entire contents of which are incorporated herein by reference.

BACKGROUND OF THE INVENTION

The present invention relates to a method of manufacturing an active-matrix substrate having thin-film transistors used as switching elements.

In recent years, active-matrix liquid crystal displays have been developed, each having many pixels arranged in high density and thin-film transistors used as switching elements. An active matrix substrate having thin-film transistors whose semiconductor layer is made of polysilicon (p-Si) attracts much attention. (Hereinafter, these thin-film transistors will be referred to as "p-Si TFTs.") This is because polysilicon excels in carrier mobility, exhibiting good semiconductor characteristic. An active-matrix liquid crystal display is being developed, in which p-Si TFTs are used to switch the pixel electrodes and the pixel electrodes and a drive circuit are mounted on the same glass substrate.

The source electrode and drain electrode of a p-Si TFT are usually formed in self-alignment by injecting impurities into a p-Si layer, while using the gate electrode as mask. Thus, the p-Si TFT has a top-gate transistor structure.

In the above-mentioned active-matrix liquid crystal display, auxiliary capacitance must be used to hold a write voltage at pixel electrodes for a predetermined time. To provide the auxiliary capacitor, auxiliary capacitance lines are formed on the active matrix substrate, independently of the gate lines of top-gate type p-Si TFT. The auxiliary capacitance lines extend parallel to the gate lines. The auxiliary capacitance lines and the gate lines have been formed by patterning a metal film.

If the metal film is not patterned as desired to form parallel gate lines and auxiliary capacitance lines, short-circuiting may occur between the gate lines and the auxiliary capacitance lines. Once short-circuiting occurs between gate lines and the auxiliary capacitance lines, it is no longer possible to provide capacitance of a desired value. Consequently, the active-matrix liquid crystal display will make errors in its operation.

In order to pattern the metal film as desired, it is proposed that the metal film be etched twice in the same pattern. If the metal film is etched twice, the number of steps of manufacturing the active-matrix substrate will increase. The manufacturing time and manufacturing cost of the active-matrix substrate will inevitably increase, too.

BRIEF SUMMARY OF THE INVENTION

The present invention has been made to solve the above-mentioned problems with the conventional active-matrix substrate. The object of the invention is to provide a method of manufacturing an active-matrix substrate that serves to display high-quality images, without increasing the manufacturing time or the manufacturing cost.

According to the invention, there is provided a method of manufacturing an active-matrix substrate, comprising: a first step of forming a semiconductor layer on an insulating substrate, the semiconductor layer having a specific shape; a second step of forming a gate insulating film on the semiconductor layer; a third step of forming a metal film on the gate insulating film; a fourth step of making openings in a first area and second area of the metal film, the first area overlapping the semiconductor layer and the second area not overlapping the semiconductor layer; a fifth step of injecting impurities into the semiconductor layer through the openings made in the first area of the metal film, thereby forming a source region and a drain region in the semiconductor layer; and a sixth step of removing some parts of the metal film, including the second area having the openings, thereby forming gate lines and auxiliary capacitance lines.

In the method, any area of the metal film, which lies between one gate line and one auxiliary capacitance line, is etched twice without increasing the number of steps of manufacturing the active-matrix substrate. Hence, the gate lines and the auxiliary capacitance lines can be patterned as desired. The probability of short-circuiting between any gate line and the adjacent auxiliary capacitance line is therefore low. This helps enhance the manufacturing yield of the active-matrix substrate of high quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A to 4D are sectional views, each taken along line A-B-C-D-E in FIG. 1, for explaining the steps of the method of manufacturing the active-matrix substrate shown in FIG. 1;

DETAILED DESCRIPTION OF THE INVENTION

A method of manufacturing an active-matrix substrate, according to the present invention, will be described with reference to the accompanying drawings.

Figure 1:
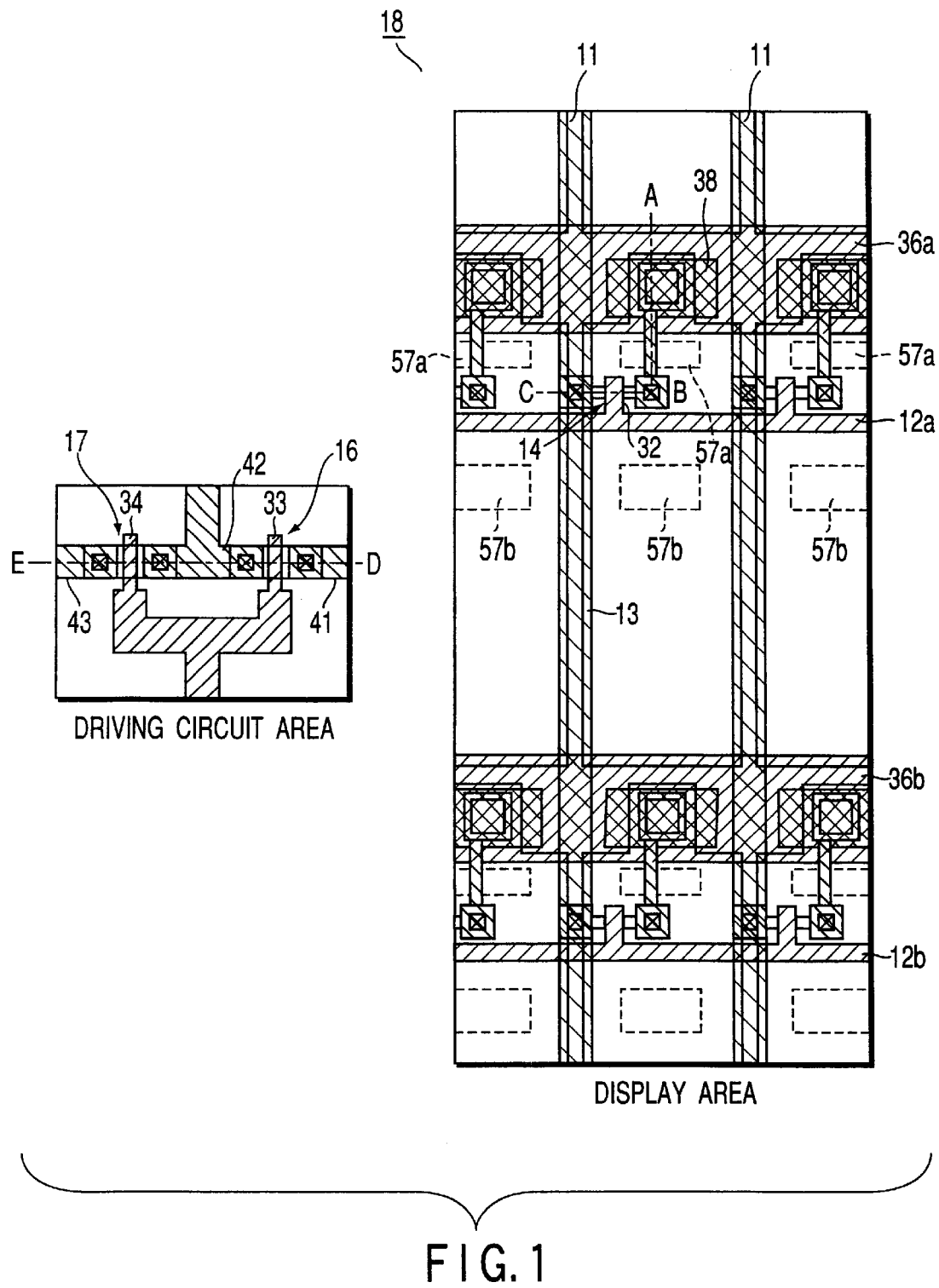
FIG. 1 is a schematic plan view of showing parts of an active-matrix substrate manufactured by a method according to the present invention.
Figure 2:
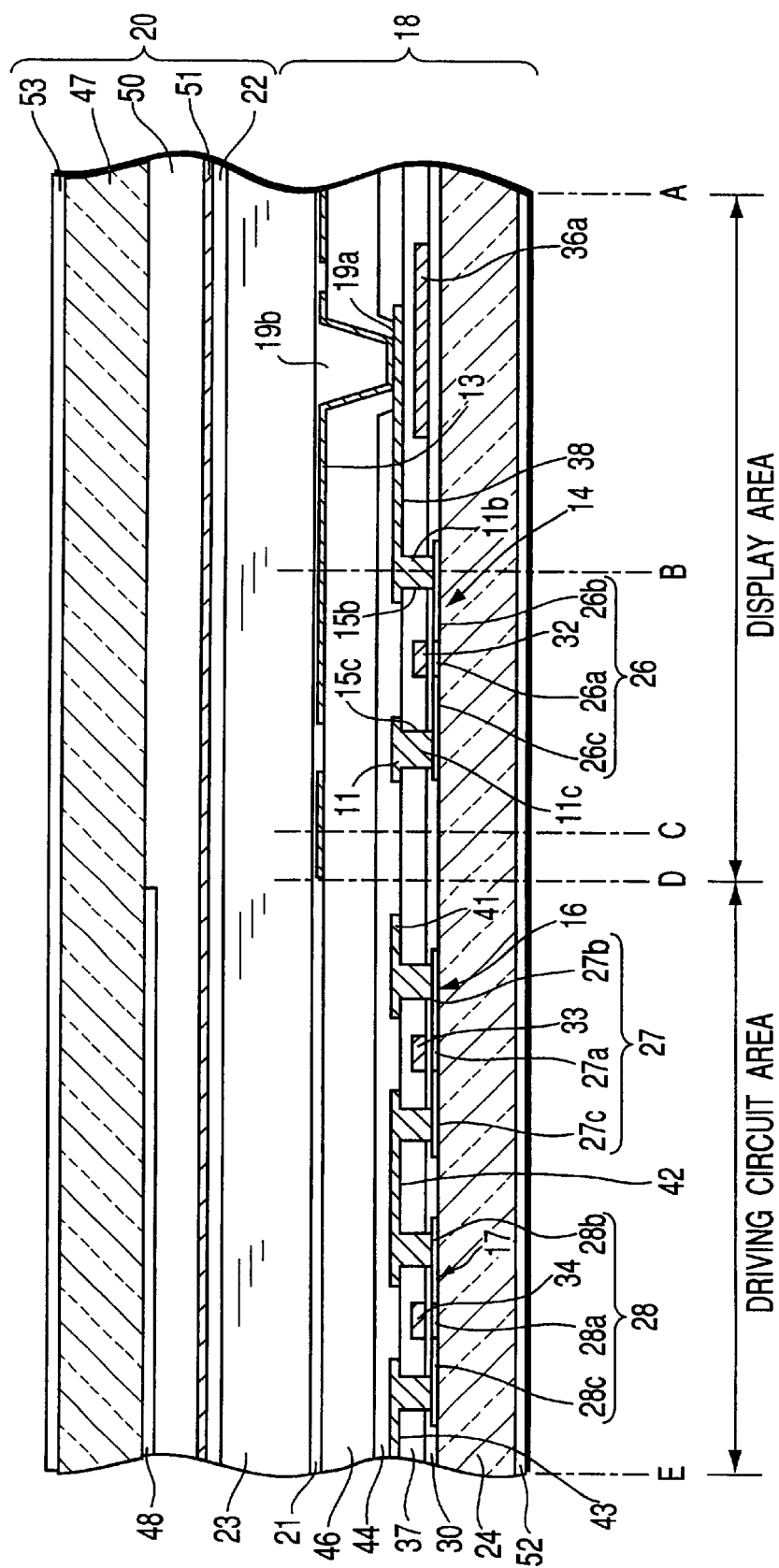
FIG. 2 is a sectional view of a liquid crystal display having the active-matrix substrate, taken along line A-B-C-D-E line shown in FIG. 1.

As shown in FIGS. 1 and 2, an active-matrix liquid crystal display comprises an active-matrix substrate 18, a counter substrate 20, two orientation films 21 and 22, and a layer 23 of nematic liquid crystal. The orientation films 21 and 22 are provided on the inner surfaces of the substrates 18 and 20, respectively. The liquid crystal layer 23 is sealed in the gap between the orientation films 21 and 22. The liquid crystal display further comprises a plurality of signal lines 11 and plurality of gate lines 12 (12a, 12b, . . . ). The gate lines 12 intersect with the signal lines 11. The active-matrix substrate 18 has a display area and a driving circuit area. In the display area of the substrate 18, n-type p-Si TFTs 14, i.e., elements for driving pixel electrodes 13, are provided at the intersections of the signal lines 11 and gate lines 12. In the driving circuit area of the substrate 18, n-type p-Si TFTs 16 and p-type p-Si TFTs 17, i.e., the elements of a drive circuit, are provided.

The active-matrix substrate 18 comprises a glass substrate 24, i.e., an insulating substrate. The substrate 18 has an n-type semiconductor layer 26 in the display area. The n-type semiconductor layer 26 is formed on the glass substrate 24 and has a specific shape. The layer 26 has a channel region 26a, a source region 26b and a drain region 26c, all for the n-type p-Si TFTs. The source region 26b and the drain region 26c are doped with phosphorus ions ($P^+$).

The active-matrix substrate 18 further has an n-type semiconductor layer 27 and a p-type semiconductor layer 28 in the drive circuit area. Both semiconductor layers 27 and 28 are formed on the glass substrate 24 and have specific shapes. The n-type semiconductor layer 27 has a channel region 27a, a source region 27b and a drain region 27c, all for the n-type p-Si TFTs 16. The source region 27b band the drain region 27c are doped with phosphorus ions ($P^+$). The p-type semiconductor layer 28 has a channel region 28a, a drain region 28b and a source region 28c, all for the p-type p-Si TFTs 17. The source region 28b and the drain region 28c are doped with boron ions ($B^+$).

A gate insulating film 30 made of silicon oxide ($SiO_2$) is formed on the semiconductor layers 26, 27 and 28. The p-Si TFTs 14, 16 and 17 have gate electrodes 32, 33 and 34, respectively, which are formed integral with the gate lines 12 (12a, 12b, . . . ). The gate electrodes 32, 33 and 34 are provided on the gate insulating film 30 and vertically aligned with the channel regions 26a, 27a and 28a, respectively, which are provided in the semiconductor layers 26, 27 and 28. Auxiliary capacitance lines 36 (36a, 36b, . . . ) are provided, extending parallel to the gate lines 12 (12a, 12b, . . . ) and electrically isolated therefrom. The gate lines 12, gate electrodes 32, 33 and 34 and auxiliary capacitance lines 36 are made of tantalum (Ta), chromium (Cr), Aluminum (Al), molybdenum (Mo), tungsten (W) or the like. Alternatively, they may be made of any possible alloy of these metal. Still alternatively, they may be each composed of layers of these metals.

An inter-layer insulating film 37 covers the gate lines 12, gate electrodes 32,33 and 34 and auxiliary capacitance lines 36. The insulating film 37 is made of silicon oxide ($SiO_2$).

In the display area of the substrate 18, source electrodes 11b and drain electrodes 11c are arranged on the inter-layer insulating film 37. The source electrodes 11b extend through contact holes 15b made in the gate insulating film 30 and inter-layer insulting film 37. Each source electrode 11b is connected to the source region 26b and formed integral with an auxiliary capacitance electrode 38. The electrode 38 cooperates with one auxiliary capacitance line 36 to provide auxiliary capacitance. The drain electrodes 11c extend through contact holes 15c made in the gate insulating film 30 and inter-layer insulting film 37. Each drain electrode 11c is connected to the drain region 26c and formed integral with one signal line 11. The source electrodes 11b, auxiliary capacitance electrodes 38, drain electrodes 11c and signal lines 11 are made of tantalum (Ta), chromium (Cr), Aluminum (Al), molybdenum (Mo), tungsten (W) or the like. Alternatively, they may be made of any possible alloy of these metal, or they may be each composed of layers of these metals.

In the driving circuit area of the substrate 18, wires 41, 42 and 43 are connected to the n-type semiconductor layer 27 and the p-type semiconductor layer 28. The wires 41, 42 and 43 are arranged on the inter-layer insulating film 37. They extend through the contact holes made in the gate insulating film 30 and inter-layer insulting film 37. Each wire is connected to the source region and the drain region of the semiconductor layers 27, 28. The wires 41, 42 and 43 are made of tantalum (Ta), chromium (Cr), Aluminum (Al), molybdenum (Mo), tungsten (W) or the like. Alternatively, they may be made of any possible alloy of these metal, or they may be each composed of layers of these metals.

A protective insulating film 44 made of silicon nitride (SiNx) is provided, covering the signal line 11, the auxiliary capacitance electrode 38, and the wires 41, 42 and 43. Further, an organic insulating film 46 is provided on the protective insulating film 44. In the display area of the substrate 18, the pixel electrodes 13 are provided on the organic insulating film 46. The pixel electrodes 13 are connected to the auxiliary capacitance electrodes 38, each extending through a contact hole 19b made in the organic insulating film 46 and a contact hole 19a made in the protective insulating film 44. The pixel electrodes 13 are made of transparent conductive material such as indium-tin-oxide (ITO).

As shown in FIG. 1, the active-matrix substrate 18 has regions 57a and regions 57b, at which neither the gate lines 12 nor the auxiliary capacitance lines 36 overlap the semiconductor layer 26. That is, each first region 57a lies between the gate line 12a and the auxiliary capacitance line 36a, whereas each second region 57b lies between the gate line 12a and the auxiliary capacitance line 36b. At the first regions 57a and second regions 57b, a step of removing a metal film has been performed at least two times. A metal film has thereby been completely removed from the first regions 57a and second regions 57b.

The counter substrate 20 has a light-shielding film 48 in the driving circuit area. The film 48 is provided on the glass substrate 47, i.e., insulting substrate, and is made of, for example, chromium (Cr). The counter substrate 20 has black stripes (not shown) and a color filter 50 in the display area. The color filter 50 comprises red (R) layers, green (G) layers and blue (B) layers. The entire surface of the color filter 50 is covered with a counter electrode 51. The counter electrode 51 is made of transparent conductive material such as ITO.

The active-matrix substrate 18 has a polarizing plate 52 on its outer surface. Similarly, the counter substrate 20 has a polarizing plate 53 on its outer surface.

A method of manufacturing the active-matrix substrate 18 will be described, with reference to FIGS. 3A to 3D and FIGS. 4A to 4D.

Figure 3A:
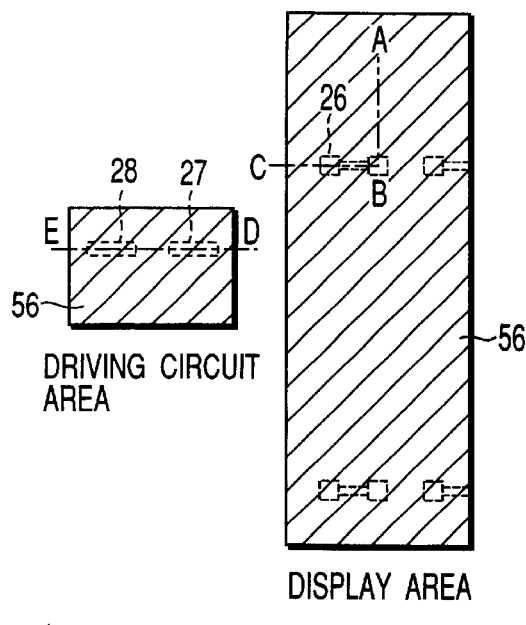
FIGS. 3A to 3D are schematic plan views for explaining the steps of the method of manufacturing the active-matrix substrate shown in FIG. 1.

As shown in FIGS. 3A and 4A, the first step is performed to from a semiconductor layer of a specific shape on the glass substrate 24. More precisely, amorphous silicon (hereinafter referred to as "a-Si") is deposited on the glass substrate 24 by means of CVD (Chemical vapor Deposition), forming a-Si film. The a-Si film is then annealed in a furnace at about 450° C. for one hour. A laser beam is applied to the a-Si film from an excimer laser (XeCl), thereby activating the a-Si film. The a-Si film is thereby made into a polysilicon film (hereinafter referred to as "p-Si film"). The p-Si film is patterned by means of photolithography. Semiconductor layers 26, 27 and 28 are thereby formed for the n-type p-Si TFTs 14 in the display area, the n-type p-Si TFTs 16 in the driving circuit area and the p-type p-Si TFTs 17 in the driving circuit area, respectively.

Next, the second step is carried out to form a gate insulating film 30 on the semiconductor layer. That is, silicon oxide ($SiO_2$) is deposited by CVD to a thickness of 140 nm on the entire surface of the glass substrate 24, covering the semiconductor layers 26, 27 and 28 provided on the glass substrate 24.

Then, the third step is performed to form a metal film on the gate insulating film 30. To be more specific, a metal film 56 having a thickness of 400 nm is formed on the gate insulating film 30 by means of sputtering. As indicated above, the metal film 56 is made of tantalum (Ta), chromium (Cr), Aluminum (Al), molybdenum (Mo), tungsten (W) or the like. Alternatively, the film 56 may be made of any possible alloy of these metal or may be composed of layers of these metals.

Figure 3B:
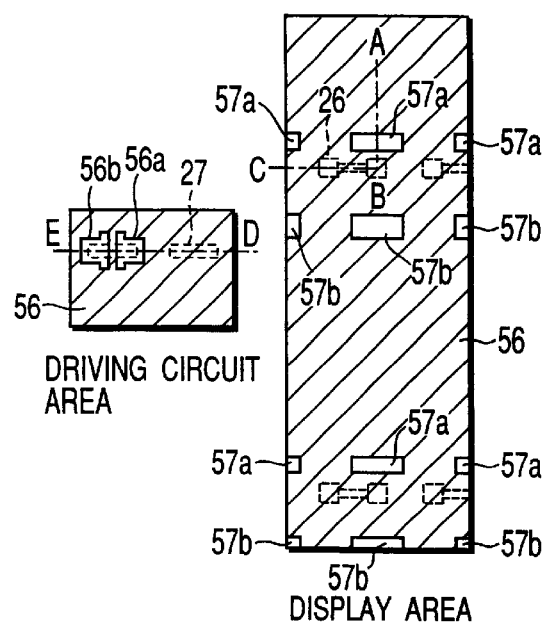

As shown in FIGS. 3B and 4B, the fourth step is effected to make holes in the first area of the metal film 56, which overlaps the semiconductor layers 26, 27 and 28, and also in the second area of the metal film 56, which does not overlap the semiconductor layers 26, 27 and 28. That is, photolithography is conducted, thereby removing those parts (the first area) of the metal film 56 which overlap the semiconductor layer 28, making through holes 56a and 56b in the metal film 56 and forming a gate electrode 34. Hence, impurities may be injected via these holes into the semiconductor layer 28 to form a source region and a drain region in the semiconductor layer 28. In the photolithography, at the same time, those parts (the second area) of the meal film 56 which do not overlap the semiconductor layer 28 ( i.e., the first region 57a lying between the gate line 12a and the auxiliary capacitance line 36a and the second region 57b lying between the gate line 12a and the auxiliary capacitance line 36b) are removed, making openings in the metal film 56.

Then, the fifth step is effected to inject impurities into the semiconductor layer 28 via the openings 56a and 56b made in the first area of the metal film 56 thereby forming the drain region 28b and the source region 28c. More specifically, the impurities are injected into the semiconductor layer 28 by means of ion implantation or ion doping, in which the gate electrode 34 as mask. The impurities are injection at an acceleration voltage of 80 kev in an dose of $5\times10^{15}$ atoms/$cm^2$. That is, $B_2H_6/H_2$ is applied, injecting boron ions ($B^+$) at high concentration into the semiconductor layer 28. Thus, the drain region 28c and the source region 28b are formed in the semiconductor layer 28.

Figure 3C:
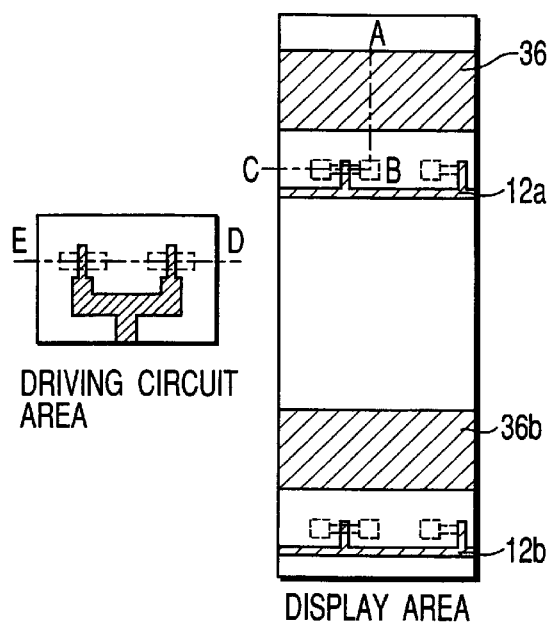

Next, as shown in FIGS. 3C and 4C, the sixth step is performed to remove some parts of the metal film 56, including the first regions 57a and second regions 57b of the second area, thereby to from the gate lines 12 (12a, 12b, ...) and the auxiliary capacitance lines 36 (36a, 36b, ...). That is, photolithography is carried out, patterning the metal film 56, forming the gate electrodes 32 of the n-type p-Si TFTs 14 (in the display area), the gate lines 12, the auxiliary capacitance lines 36 and the gate electrodes 33 of the n-type p-Si TFTs 16 (in the driving circuit area).

In the sixth step (i.e., patterning process), those parts of the metal film 56, including the first regions 57a and second regions 57b, the region between adjacent first regions 57a, and the region between adjacent second regions 57b, made in the second area extending along the gate lines 12 and auxiliary capacitance lines 36, are removed. Thus, the first regions 57a and second regions 57b are removed. The metal film 56 is therefore etched (by means of photolithography in the fourth and sixth step) twice at the first region 57a lying between the gate line 12a and the auxiliary capacitance line 36a and the second region 57b lying between the gate line 12b and the auxiliary capacitance line 36b. Therefore, the regions 57a and 57b of the metal film 56 are thoroughly removed. As a result, the gate lines 12 (12a, 12b, ...) and the auxiliary capacitance lines 36 (36a, 36b, ...) extend parallel to one another and are electrically isolated from one another.

Then, a resist is formed, covering the driving circuit area, so that no impurities may be injected into the p-type p-Si TFTs 17. Thereafter, impurities are injected into the semiconductor layers 26 and 27 by means of ion doping, in which the gate electrodes 32 and 33 are used as mask. The impurities are injection at an acceleration voltage of 80 kev in an dose of $5\times10^{15}$ atoms/$cm^2$. That is, $PH_3/H_2$ is applied, injecting phosphorus ions ($P^+$) at high concentration into the semiconductor layers 26 and 27. Thus, the drain region 26c and source region 26b of each n-type p-Si TFT 14 are formed in the semiconductor layer 26, and the drain region 27c and source region 27b of each n-type p-Si TFT 16 are formed in the semiconductor layer 27.

Further, the glass substrate 24 is annealed, thereby activating the impurities which have been injected into the semiconductor layers 26, 27 and 28.

Figure 3D:
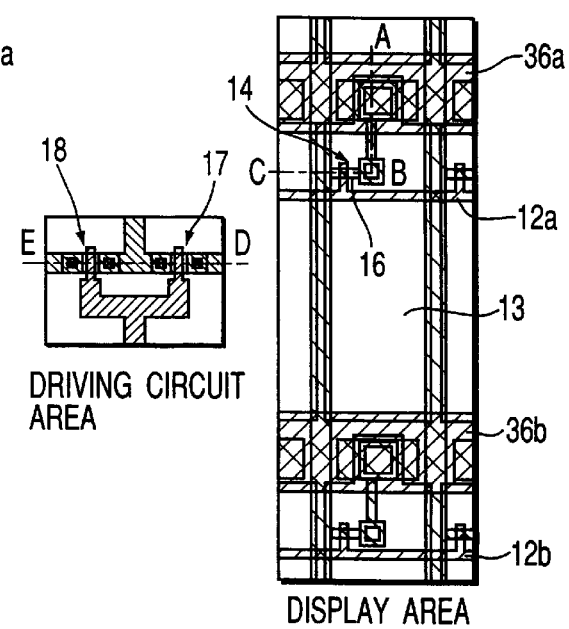

As shown in FIGS. 3D and 4D, the inter-layer insulating film 37 made of silicon oxide ($SiO_2$) is formed on the glass substrate 24 to a thickness of about 500 nm, by means of, for example, plasma CVD. This done, photolithography is performed, making contact holes in the inter-layer insulating film 37 and the gate insulating film 30. The contact holes, thus made, reach the drain region 26c and source region 26b of each n-type p-Si TFT 14, the drain region 27c and source region 27b of each n-type p-Si TFT 16, and the drain region 28c and source region 28b of each p-type p-Si TFT 17. A metal film is formed to a thickness of 500 nm on the inter-layer insulating film 37, by means of sputtering. As has been described, this metal film is made of tantalum (Ta), chromium (Cr), Aluminum (Al), molybdenum (Mo), tungsten (W) or the like. Alternatively, the metal film may be made of any possible alloy of these metal or may be composed of layers of these metals.

The metal film is patterned by photolithography. Signal lines 11 are thereby formed in the display area, which are integral with the drain electrodes 11c connected to the drain regions 26c in the semiconductor layer 26. Auxiliary capacitance lines 38 are simultaneously formed in the display area, which integral with the source electrodes 11b connected to the source region 26b in the semiconductor layer 26. In the photolithography, too, various signal lines 41, 42 and 43 are formed in the driving circuit area, which are connected to the source regions 27b and drain regions 27c formed in the semiconductor layer 27 and to the source regions 28b and drain regions 28c formed in the semiconductor layer 28.

Next, plasma CVD is performed, forming the protective insulating film 44 made of silicon nitride (SiN$_x$), on the entire surface of the glass substrate 24. The plasma CVD is followed by photolithography, in which through holes 19a are formed in the protective insulating film 44. Each through hole 19a reaches one auxiliary capacitance electrode 38. The entire surface of the protective insulating film 44 is coated with organic insulating material, forming an organic insulating film 46 that is 2 μm to 4 μm thick. Photolithography is conducted, making through holes 19b in the organic insulating film 46. Each through hole 19b is coaxial and communicates with one through hole 19a made in the protective insulating film 44. The hole 19b therefore reaches one auxiliary capacitance electrode 38, too.

Then, sputtering is conducted, forming an ITO film having a thickness of 100 nm, on the entire surface of the organic insulating film 46. Finally, photolithography is carried out, patterning the ITO film and thereby forming pixel electrodes 13, which are electrically connected to the auxiliary capacitance electrodes 38 via through holes 19a and 19b.

Thus, the active-matrix substrate 18 is manufactured.

How the counter substrate 20 is manufactured will be described. First, sputtering is effected, forming a chromium (Cr) film on the glass substrate 47. Photolithography is then performed, patterning the chromium film. The light-shielding film 48 is thereby formed. The color filter 50 is formed, which comprises colored layers containing pigments dispersed in them. Sputtering is conducted, forming the counter electrode 51 made of ITO on the entire surface of the color filter 50. The counter substrate 20 is thereby manufactured.

The surface of the active-matrix substrate 18, on which the pixel electrodes 13 are mounted, is print-coated with polyimide of low-temperature curing type. Similarly, the surface of the counter electrode 51 of the counter substrate 20 is print-coated with polyimide of low-temperature curing type. A polyimide film is thereby formed on the active-matrix substrate 18, and a polyimide film is formed on the counter electrode 51. The polyimide films are rubbed so that their orientation axes intersect at 90° when the substrate 18 and 20 are positioned to oppose each other. Thereafter, the substrates 18 and 20 are combined, with a gap between them. The gap is filled with nematic liquid crystal 23. Finally, the polarizing plate 52 is bonded to the outer surface of the active-matrix substrate 18, and the polarizing plate 53 to the outer surface of the counter substrate 20. As a result, the liquid crystal display 10 is manufactured.

In the method of manufacturing the active-matrix substrate 18, described above, the metal film 56 of the first regions 57a and second regions 57b are removed in the step of making the through holes 56a and 56b (i.e., ion-doping holes) in the metal film 56. The first region 57a and the second region 57b do not overlaps any semiconductor layers; they will be located between the gate line 12 and the auxiliary capacitance line 36. After these parts of the metal film 56 are removed, the metal film 56 is patterned, whereby the gate lines 12 and the auxiliary capacitance lines 36 are formed, together with various wires including the gate electrodes 32 of n-type p-Si TFTs 14 and the gate electrodes 33 of n-type P-Si TFTs 16. In the patterning, said parts of the metal film 56, including the first region 57a and the second region 57b are removed.

Hence, etching by means of photolithography is performed at least twice at the first region 57a and second region 57b which lie between the gate lines 12 and the auxiliary capacitance lines 36, without increasing the number of steps of manufacturing the active-matrix substrate 18.

Since the metal film 56 is etched twice at the regions 57a and 57b, its unnecessary parts are thoroughly removed, forming the gate lines 12 and auxiliary capacitance lines 36. The gate lines 12 and auxiliary capacitance lines 36, thus formed, are electrically isolated from one another. The probability of short-circuiting between these lines 12 and 36 is very low. This helps enhance the manufacturing yield of the active-matrix substrate 18. Each auxiliary capacitance line 36 cooperates with the associated auxiliary capacitance electrode 38 to provide a sufficient auxiliary capacitance. Incorporating the active-matrix substrate 18, the liquid crystal display 10 can display high-quality images.

The present invention is not limited to the embodiment described above. Rather, various changes and modifications can be made without departing from the scope of the invention.

In the embodiment described above, parts of the metal film are removed, in the fourth step (FIGS. 3B and 4B), from the first area overlapping the semiconductor layer 28 provided in the driving circuit area, thus making openings in the metal film. Impurities are injected through the opening into the layer 28 in the fifth step, thereby forming the source region 28b and drain region 28c of a p-type a-Si TFT 17. Instead, parts of the metal film which overlap the semiconductor layer 26 provided in the display area and the semiconductor layer 27 provided in the driving circuit area, may be removed in the fourth step, thereby making openings in the metal film. In this case, the impurities may be injected through the openings into the layers 26 and 27 in the fifth step, thereby to form the source region 26b and the drain region 26c of an n-type p-Si TFT 14 and the source region 27b and the drain region 27c of an n-type p-Si TFT 16.

Moreover, the auxiliary capacitance lines may be made of material other than those specified above and may have a thickness difference from the one specified above. Further, the regions of the metal film, which lie between the gate lines and the auxiliary capacitance lines and parts of which are removed to make through holes for use in doping the p-Si film of the TFTs, may have any shape and any size desirable, as will be exemplified in the following modifications 1 to 6.

(Modification 1)

Figures 5, 6:
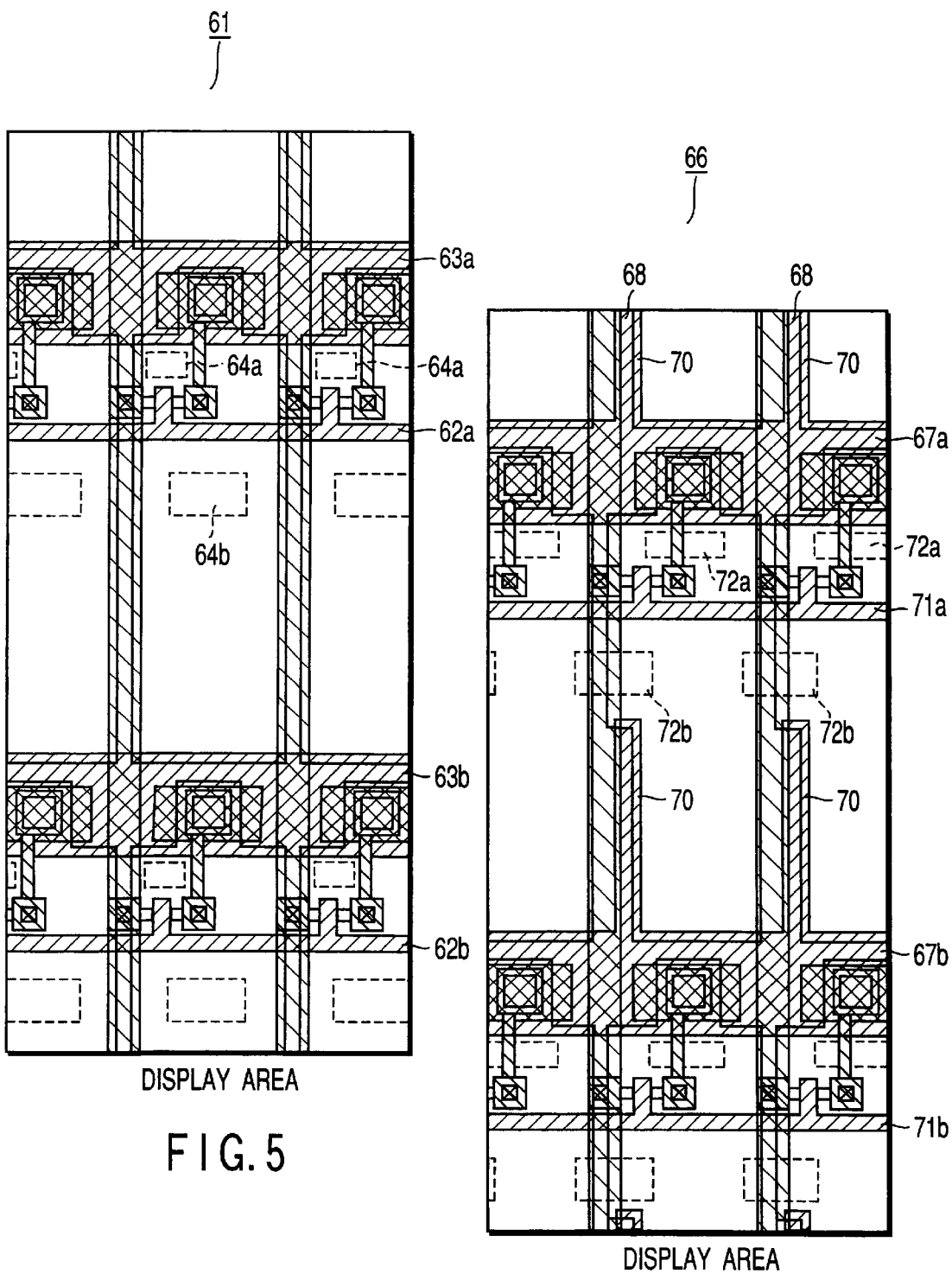
FIG. 5 is a schematic plan view showing a part of an active-matrix substrate manufactured by a modified method 1 according to the invention.
FIG. 6 is a schematic plan view illustrating a part of an active-matrix substrate manufactured by a modified method 2 according to the invention.

The modification 1 shown in FIG. 5, or an active-matrix substrate 61, has gate lines 62 (62a, 62b, ...) and auxiliary capacitance lines 63 (63a, 63b, ...). The first region 64a of the metal film, which lies between the first gate line 62a and the first auxiliary capacitance line 63a, is the narrowest one provided on the substrate 61. By contrast, the second region 64b of the metal film, which lies between the first gate line 62a and the second auxiliary capacitance line 63b, is similar to the second region 57b provided in the embodiment described above.

As seen from FIG. 5, openings are made in the first region 64a and the second region 64b of the metal film. Thereafter, the metal film is patterned, removing the metal film including the regions 64a and 64b, thereby forming the gate lines 62 (62a, 62b, ...) and the auxiliary capacitance lines 63 (63a, 63b, ...). Thus, the metal film is etched twice at the regions 64a, where the first gate line 62a and the first auxiliary capacitance line 63a are spaced apart for a shorter distance than any other gate line and any other auxiliary capacitance line. The probability of short-circuiting between these lines 62a and 63a is therefore very low. This helps enhance the manufacturing yield of the active-matrix substrate 61.

(Modification 2)

The modification 2 shown in FIG. 6, or an active-matrix substrate 66, has signal lines 68, auxiliary capacitance lines 67 (67a, 67b, . . . ), shield electrodes 70, and gate lines 71 (71a, 71b, . . . ). The shield electrodes 70 extend along the signal lines 68 and are formed integral with the auxiliary capacitance lines 67. The first region 72a between the first gate line 71a and the first auxiliary capacitance line 67a is similar to the first region 57a provided in the embodiment described above. Each second region 72b is provided between the first gate line 71a and the second auxiliary capacitance line 67b, that it crosses the signal line 68 in the region between one shield electrode 70 and one second auxiliary capacitance line 67b.

As seen from FIG. 6, openings are made in the first region 72a and the second region 72b of the metal film. Then, the metal film is patterned, removing the metal film including the first region 72a and the second region 72b, thereby forming the gate lines 71 (71a, 71b, . . . ), the auxiliary capacitance lines 67 (67a, 67b, . . . ), and the shield electrodes 70. Thus, the metal film is etched twice at the second region 72b, where the first gate line 71a and the shield electrode 70 may not be formed as desired by patterning the metal film. It follows that each gate line 71 and the adjacent auxiliary capacitance line 67 (including the shield electrode 70) are reliably isolated electrically. The probability of short-circuiting between each gate line 71 and the adjacent auxiliary capacitance line 67 is therefore very low. This helps enhance the manufacturing yield of the active-matrix substrate 66.

(Modification 3)

Figures 7, 8:
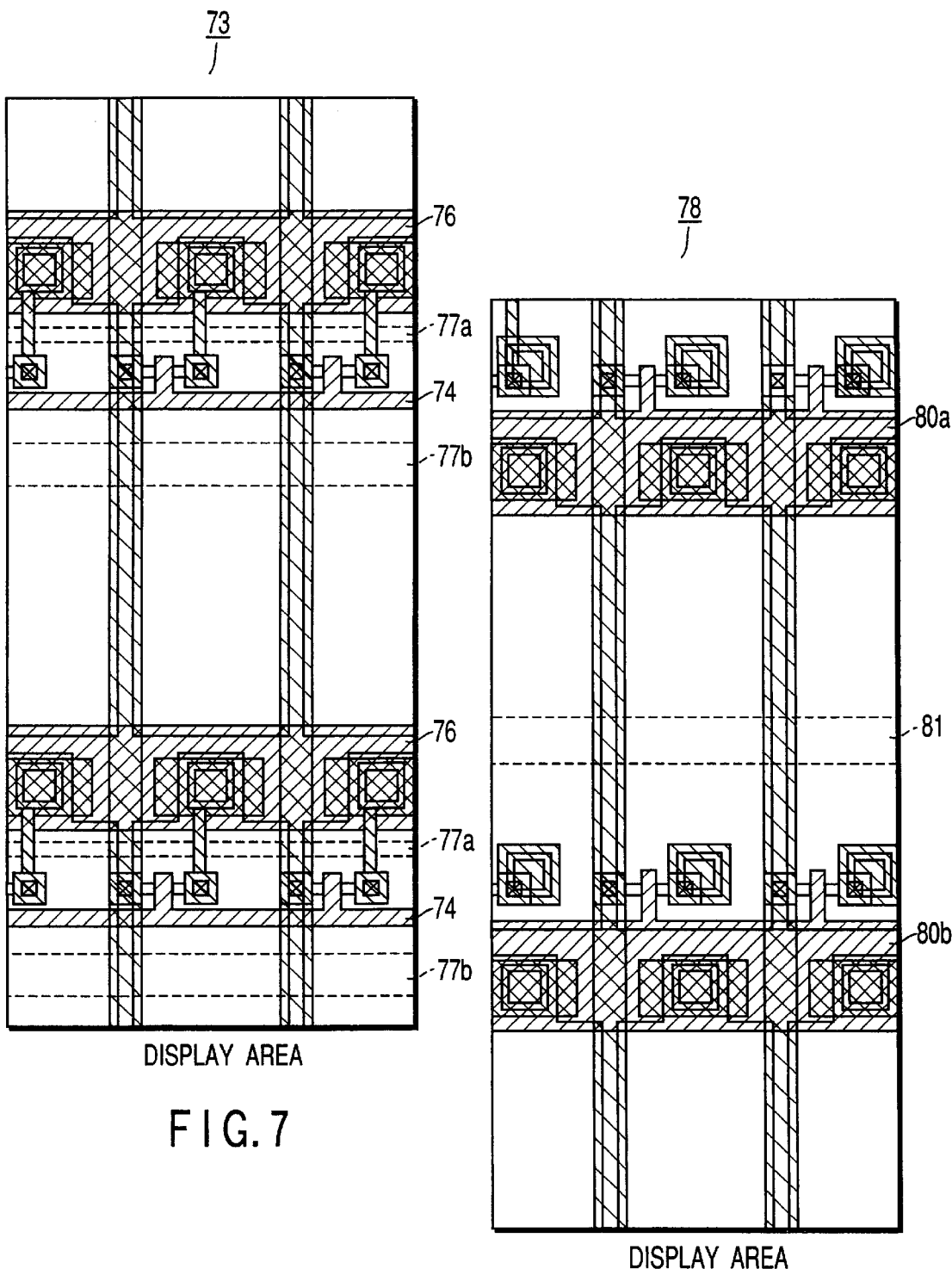
FIG. 7 is a schematic plan view showing a part of an active-matrix substrate manufactured by a modified method 3 according to the invention.
FIG. 8 is a schematic plan view depicting a part of an active-matrix substrate manufactured by a modified method 4 according to the invention.

The modification 3 shown in FIG. 7, i.e., an active-matrix substrate 73, has gate lines 74 and auxiliary capacitance lines 76. First regions 77a and second regions 77b are provided, each between one gate line 74 and the adjacent auxiliary capacitance line 76. Each of the regions 77a and 77b extends over the rows of pixels which are arranged along the gate lines 74 and the auxiliary capacitance lines 76.

As seen from FIG. 7, stripe-shaped openings are made in a metal film, at the first regions 77a and the second regions 77b. Then, the metal film is patterned, removing the metal film including the regions 77a and 77b, thereby forming the gate lines 74 and the auxiliary capacitance lines 76. Thus, the metal film is etched twice at the regions 77a and 77b, where one gate line 74 and one auxiliary capacitance line 76 may not be formed as desired by patterning the metal film. The space between each gate line 74 and the adjacent auxiliary capacitance line 76 may be reduced to increase the aperture ratio of the liquid crystal display that will incorporate the active-matrix substrate 73. Even if this is the case, each gate line 74 and the adjacent auxiliary capacitance line 76 are reliably isolated electrically. The probability of short-circuiting between each gate line 74 and the adjacent auxiliary capacitance line 76 is therefore very low. This helps enhance the manufacturing yield of the active-matrix substrate 73.

(Modification 4)

The modification 4 shown in FIG. 8, i.e., an active-matrix substrate 78, has gate lines 80 (80a, 80b, . . . ) what function as auxiliary capacitance lines, too. A region 81 extends over the space between the first gate line 80a and the second gate line 80b.

As seen from FIG. 8, stripe-shaped openings are made in a metal film, at the regions 81. Then, the metal film is patterned, removing some parts including the regions 81, thereby forming the gate lines 80 (80a, 80b, . . . ) functioning as auxiliary capacitance lines, as well. Thus, the metal film is etched twice at the regions 81, where the first gate line 80a and the second gate line 80b may not be formed as desired by patterning the metal film. The probability of short-circuiting between the gate lines 80a and 80b is therefore very low. This helps enhance the manufacturing yield of the active-matrix substrate 78.

(Modification 5)

Figures 9, 10:
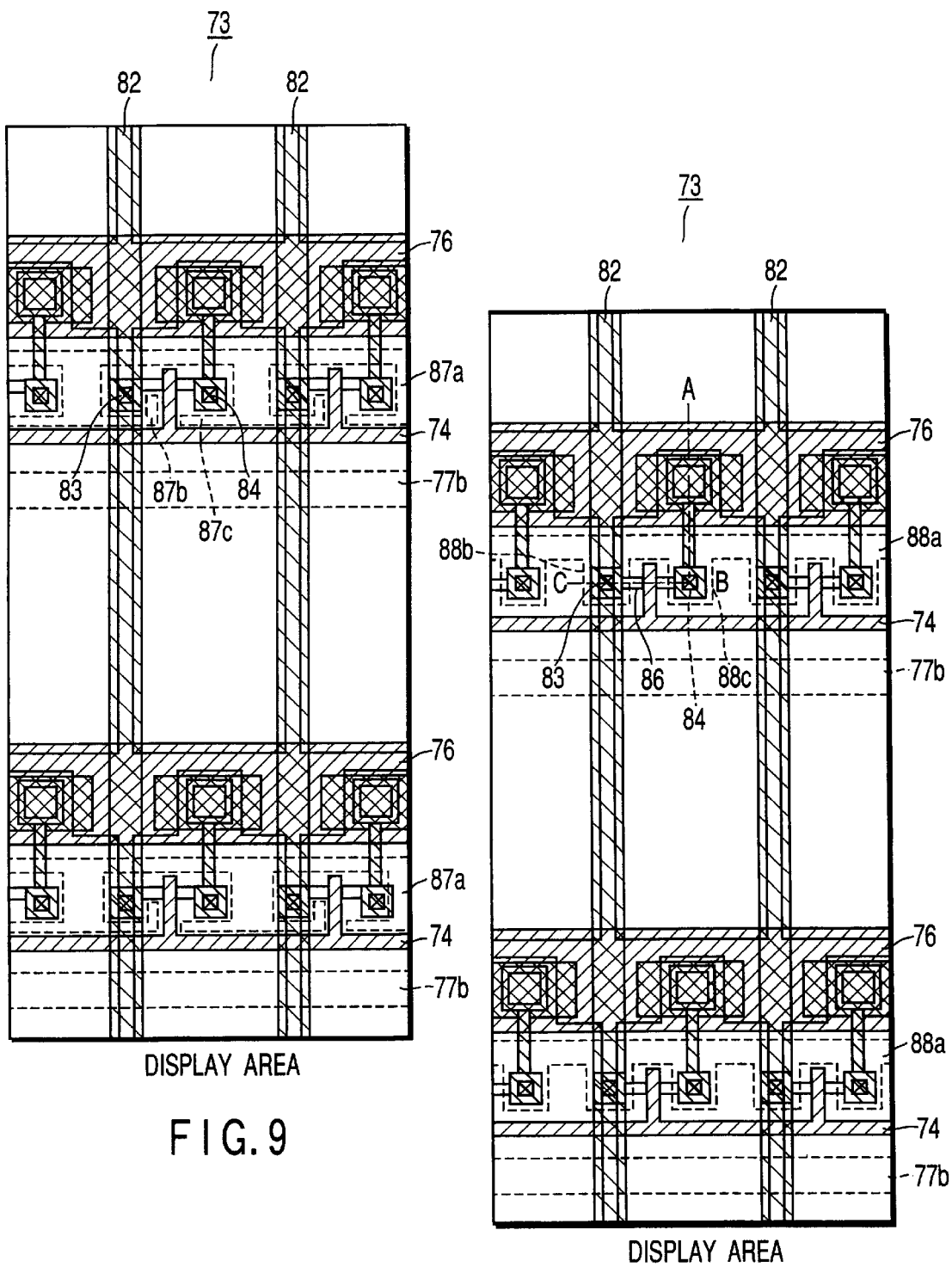
FIG. 9 is a schematic plan view showing a part of an active-matrix substrate manufactured by a modified method 5 according to the invention.
FIG. 10 is a schematic plan view illustrating a part of an active-matrix substrate manufactured by a modified method 6 according to the present invention.

The modification 5 shown in FIG. 9, i.e., an active-matrix substrate 73, has gate lines 74 and auxiliary capacitance lines 76. First regions 87a and second regions 77b are provided, each lying between one gate line 74 and the adjacent auxiliary capacitance line 76. Each of the regions 87a and 77b extends over the rows of pixels arranged along the gate lines 74 and the auxiliary capacitance lines 76, as in the modification 3. The first region 87a includes regions 87b and 87c. The region 87b lies between one gate line 74 and the junction 83 of a drain electrode connected to a signal line 82. The region 87c lies between one gate line 74 and the junction 84 of a source electrode connected to one auxiliary capacitance line 76.

As seen from FIG. 9, stripe-shaped openings are made in a metal film, at the first region 87a and the second region 77b. Then, the metal film is patterned, removing some parts including the regions 87a and 77b, thereby forming the gate lines 74 and auxiliary capacitance lines 76. Thus, the metal film is etched twice at the regions 87a and 77b, where the gate line 74 and the auxiliary capacitance line 76 may not be formed as desired by patterning the metal film. Therefore, the regions 87a and 77b of the metal film are thoroughly removed. The probability of short-circuiting between the gate line 74 and the auxiliary capacitance line 76 is therefore very low. This helps enhance the manufacturing yield of the active-matrix substrate 73. (Modification 6)

Figure 11:
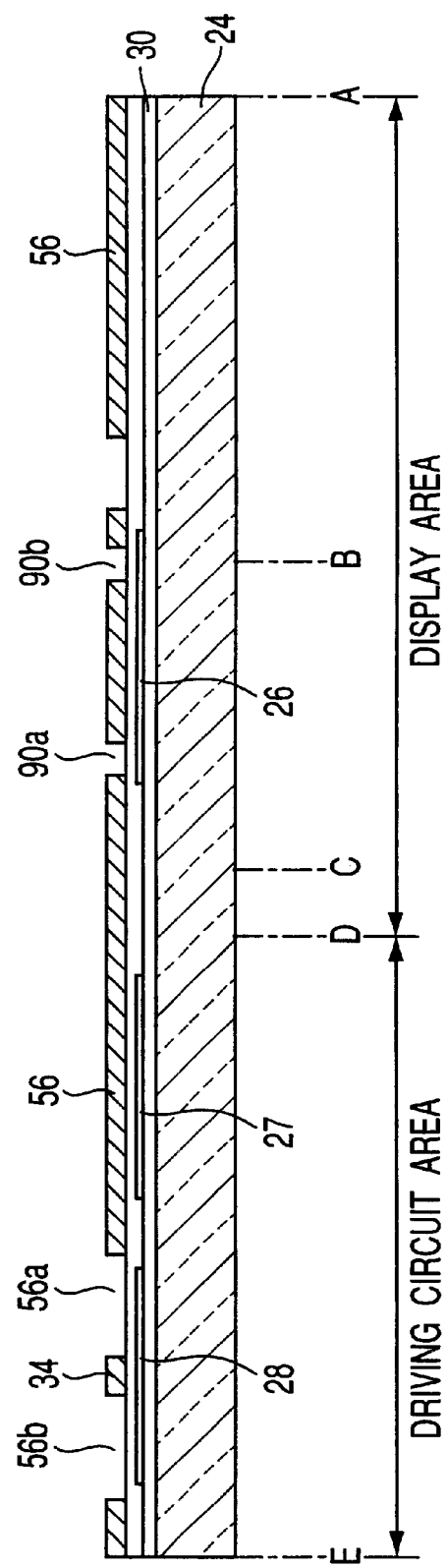
FIG. 11 is a sectional view of an active-matrix substrate shown in FIG. 10, illustrating through holes and openings made in the metal film provided on the substrate.

The modification 6 shown in FIGS. 10 and 11, i.e., an active-matrix substrate 73, has gate lines 74, auxiliary capacitance lines 76, first regions 88a, and second regions 77b. The regions 88a and 77b are provided, each between one gate line 74 and the adjacent auxiliary capacitance line 76. Each region extends over the rows of pixels arranged along the gate lines 74 and the auxiliary capacitance lines 74, as in the modification 3. The first region 88a includes the drain region 88b and source region 88c of a pixel TFT 86.

As seen from FIGS. 10 and 11, stripe-shaped openings are made in a metal film, at the first region 88a and the second region 77b. Then, the metal film is patterned, removing some parts including the regions 88a and 77b, thereby forming the gate lines 74 and auxiliary capacitance lines 76. Thus, the metal film is etched twice at the regions 88a and 77b, where the gate line 74 and the auxiliary capacitance line 76 may not be formed as desired by patterning. Therefore, the gate line 74 and the auxiliary capacitance line 76 can be reliably formed as is desire.

Furthermore, parts of the metal film are etched twice, thereby to make contact holes 90a and contact holes 90b. In the contact holes 90a, the junctions 83 of drain electrodes are provided, connecting the drain electrodes to signal lines 13. In the contact holes 90b, the junctions 84 of source electrodes are provided, connecting the source electrodes to the auxiliary capacitance lines 76. Thus, the probability of short-circuiting between the gate line 74 and the auxiliary capacitance line 76 is low not only the main parts of these lines 74 and 76, but also in the contact holes 90a and 90b. Hence, it is possible to enhance the manufacturing yield of the active-matrix substrate 73.

As has been described, those parts of a metal film, each lying between other parts which will become a gate line and an auxiliary capacitance line, are removed by means of, for example, etching in a process of making, in the metal film, through holes for achieving ion doping in a semiconductor layer. In a subsequent process, the metal film is patterned by means of, for example, etching, thereby forming the gate lines and auxiliary capacitance lines. In the subsequent process, the parts of the metal film, each lying between other parts to become a gate line and an auxiliary capacitance line, are etched for the second time.

That is, etching is performed twice at the above-mentioned parts of the metal film, without increasing the number of steps of manufacturing the active-matrix substrate. The probability of short-circuiting between any gate line and the adjacent auxiliary capacitance line is therefore low. This helps to enhance the manufacturing yield of the active-matrix substrate. In addition, a sufficient auxiliary capacitance can be provided in the active-matrix substrate thus manufactured. Hence, if the active-matrix substrate is incorporated into a liquid crystal display, the display can display high-quality images.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing an active-matrix substrate comprising:

a first step of forming a semiconductor layer on an insulating substrate, said semiconductor layer having a specific shape;

a second step of forming a gate insulating film on the semiconductor layer;

a third step of forming a metal film on the gate insulating film;

a fourth step of making openings in a first area and second area of the metal film, said first area overlapping the semiconductor layer and said second area not overlapping the semiconductor layer;

a fifth step of injecting impurities into the semiconductor layer through the openings made in the first area of the metal film, thereby forming a source region and a drain region in the semiconductor layer; and a sixth step of removing some parts of the metal film, including the second area having the openings, thereby forming gate lines and auxiliary capacitance lines.

2. The method according to claim 1, wherein the semiconductor layer is a polysilicon layer.

3. The method according to claim 1, wherein the metal film is one selected from the group consisting of a film made of tantalum (Ta), chromium (Cr), aluminum (Al), molybdenum (Mo), tungsten (W) or the like, a film made of any possible alloy of these metal and a film composed of layers of these metals.

4. The method according to claim 1, wherein the insulating substrate is a glass substrate.

5. The method according to claim 1, wherein the metal film between the openings made in the second area, which extends along the gate line and the auxiliary capacitance line, is removed, thereby forming the gate line and the auxiliary capacitance line extending parallel to each other and electrically isolated from each other.

6. The method according to claim 1, wherein the metal film has a region lying between the gate line and the auxiliary capacitance line, and said region of the metal film is processed at least twice in the step of removing some parts of the metal film.

7. The method according to claim 6, wherein said region of the metal film is processed in the fourth step for the first time and in the sixth step for the second time.

8. The method according to claim 1, wherein the openings made in the second area are located between the gate line and the auxiliary capacitance line.

* * * * *